(12) United States Patent
Morita et al.

(10) Patent No.: US 7,642,691 B2
(45) Date of Patent: Jan. 5, 2010

(54) DYNAMOELECTRIC MACHINE

(75) Inventors: Masao Morita, Toyko (JP); Ryuichi Shimomura, Tokyo (JP); Hiroyuki Akita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/347,310

(22) Filed: Dec. 31, 2008

(65) Prior Publication Data

US 2009/0200886 A1 Aug. 13, 2009

(30) Foreign Application Priority Data

Feb. 13, 2008 (JP) ............... 2008-031652

(51) Int. Cl.
*H02K 1/22* (2006.01)

(52) U.S. Cl. ................... 310/263; 310/156.72

(58) Field of Classification Search ............ 310/263, 310/156.66–156.69, 156.71–156.73
See application file for complete search history.

(56) References Cited

U.S. PATENT DOCUMENTS

| | | | | |
|---|---|---|---|---|
| 5,483,116 | A * | 1/1996 | Kusase et al. ............ | 310/263 |
| 5,793,144 | A * | 8/1998 | Kusase et al. ............ | 310/263 |
| 5,907,209 | A * | 5/1999 | Ishida ..................... | 310/263 |
| 7,545,074 | B2 * | 6/2009 | Maekawa et al. ......... | 310/263 |
| 2004/0032183 | A1 * | 2/2004 | Nakamura et al. ....... | 310/263 |
| 2004/0080235 | A1 | 4/2004 | York | |
| 2007/0228866 | A1 * | 10/2007 | Nakamura ............... | 310/263 |
| 2008/0315701 | A1 | 12/2008 | Inoue et al. | |

FOREIGN PATENT DOCUMENTS

| | | |
|---|---|---|
| JP | 2004-153994 | 5/2004 |
| WO | WO 2008/044347 A1 | 4/2008 |

* cited by examiner

*Primary Examiner*—Dang D Le
(74) *Attorney, Agent, or Firm*—Oblon, Spivak, McClelland, Maier & Neustadt, L.L.P.

(57) ABSTRACT

Resin pooling grooves are disposed so as to extend over entire regions in a thickness direction of a first magnet holder on two sides of a bottom surface in a width direction of a first receiving groove, and resin pooling grooves are also disposed so as to extend over entire regions in the thickness direction of the first magnet holder on two side surfaces of the first receiving groove near the bottom surface. A first resin injection aperture is disposed through the first magnet holder so as to communicate with the resin pooling grooves over an entire region in the thickness direction. A first permanent magnet is held by the first magnet holder by fitting the first permanent magnet into the first receiving groove together with a first magnet cover, and injecting a resin material into the resin pooling grooves through the first resin injection aperture and hardening it.

12 Claims, 8 Drawing Sheets

DYNAMOELECTRIC MACHINE

BACKGROUND OF THE INVENTION

1. Field of the Invention

The present invention relates to a dynamoelectric machine such as an automotive alternator, etc., and particularly relates to a permanent magnet fixing construction in a Lundell rotor.

2. Description of the Related Art

Automotive alternators that use Lundell rotors have been used in automobiles for decades. Loads from electrical equipment that is mounted due to environmental issues have been increasing rapidly in recent years, and further increases in generated power are being sought from Lundell rotors.

If attempts are made to answer these demands within the scope of conventional design, the alternators are invariably increased in size. Increases in alternator size increase weight and installation space.

Conventionally, in order to solve such problems, a rotor assembly has been proposed in which permanent magnets are held by a strap on mounting surfaces that are disposed on a yoke portion (see Patent Literature 1, for example).

Patent Literature 1: Japanese Patent Laid-Open No. 2004-153994 (Gazette)

In conventional rotor assemblies, because the permanent magnets are held on the mounting surfaces of the yoke portion by a fastening force from the strap, centrifugal forces act in a direction that loosens the fastening force of the strap on the permanent magnets during rotation of the rotor. Thus, one problem has been that the fastening force on the permanent magnets from the strap becomes loose, allowing the permanent magnets to wobble due to vibrations from the engine, etc., and generate noise.

Now, it is conceivable that the wobbling of the permanent magnets could be suppressed by fixing the permanent magnets to the strap and the mounting surfaces of the yoke portion using an adhesive. However, the adhesive cannot be injected between the strap and the permanent magnets and between the permanent magnets and the mounting surfaces when the permanent magnets are held on the mounting surfaces by the strap. Thus, the adhesive would have to be applied to the permanent magnets and the strap before the permanent magnets are held on the mounting surfaces, making handling of the magnetized permanent magnets and the strap problematic and reducing mass producibility.

SUMMARY OF THE INVENTION

The present invention aims to solve the above problems and an object of the present invention is to provide a dynamoelectric machine that enables mass producibility to be increased and also enables occurrences of noise that result from wobbling of a permanent magnet to be suppressed by enabling fixing of a permanent magnet by a resin material to be performed easily.

In order to achieve the above object, according to one aspect of the present invention, there is provided a dynamoelectric machine including: a rotor having: a pole core having: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, the pole core being fixed to a rotating shaft that is inserted through a central axial position of the boss portion; and a field coil that is housed inside a space that is surrounded by the boss portion, the pair of yoke portions, and the plurality of claw-shaped magnetic pole portions; and a stator that is disposed so as to surround an outer circumference of the rotor so as to form a predetermined air gap. In addition, the dynamoelectric machine includes: a magnet holder that is held between circumferentially-adjacent claw-shaped magnetic pole portions of the pair of yoke portions, a receiving groove being recessed into an upper surface of the magnet holder so as to pass through in the axial direction; a permanent magnet that is mounted to the magnet holder by fitting together with the receiving groove so as to face an inner circumferential surface near a tip end of the claw-shaped magnetic pole portion; a magnet cover that has: a base portion; and a pair of wing portions that are disposed so as to extend from two opposite sides of the base portion, the magnet cover being mounted to the permanent magnet such that an upper surface of the permanent magnet is covered by the base portion and the pair of wing portions are placed alongside two circumferential end surfaces of the permanent magnet, and being mounted to the magnet holder such that leading end portions of the pair of wing portions are fitted between the permanent magnet and the receiving groove; a resin material that fixes the permanent magnet and the magnet cover to the magnet holder by filling an adhesive space that is bounded by the permanent magnet, the magnet cover, and the receiving groove; and a resin injection aperture that is formed on the magnet holder so as to communicate between an external portion of the magnet holder and the adhesive space.

According to the present invention, because the resin injection aperture is formed so as to communicate between the external portion of the magnet holder and the adhesive space that is bounded by the permanent magnet, the magnet cover, and the receiving groove, the resin material can be injected through the resin injection aperture so as to fill the adhesive space after the permanent magnet and the magnet cover have been installed in the magnet holder. Thus, it is not necessary to apply the resin material to the permanent magnet and the magnet cover before the process of installing the permanent magnet and the magnet cover in the magnet holder, facilitating handling of the permanent magnet and the magnet cover, and enabling mass producibility to be increased. Because the adhesive space can be filled amply with the resin material through the resin injection aperture, the adhesive force of the permanent magnet and the magnet cover on the magnet holder is increased, suppressing the occurrence of noise that results from wobbling of the permanent magnet.

DETAILED DESCRIPTION OF THE PREFERRED EMBODIMENTS

Preferred embodiments of the present invention will now be explained with reference to the drawings.

Embodiment 1

Figure 1:
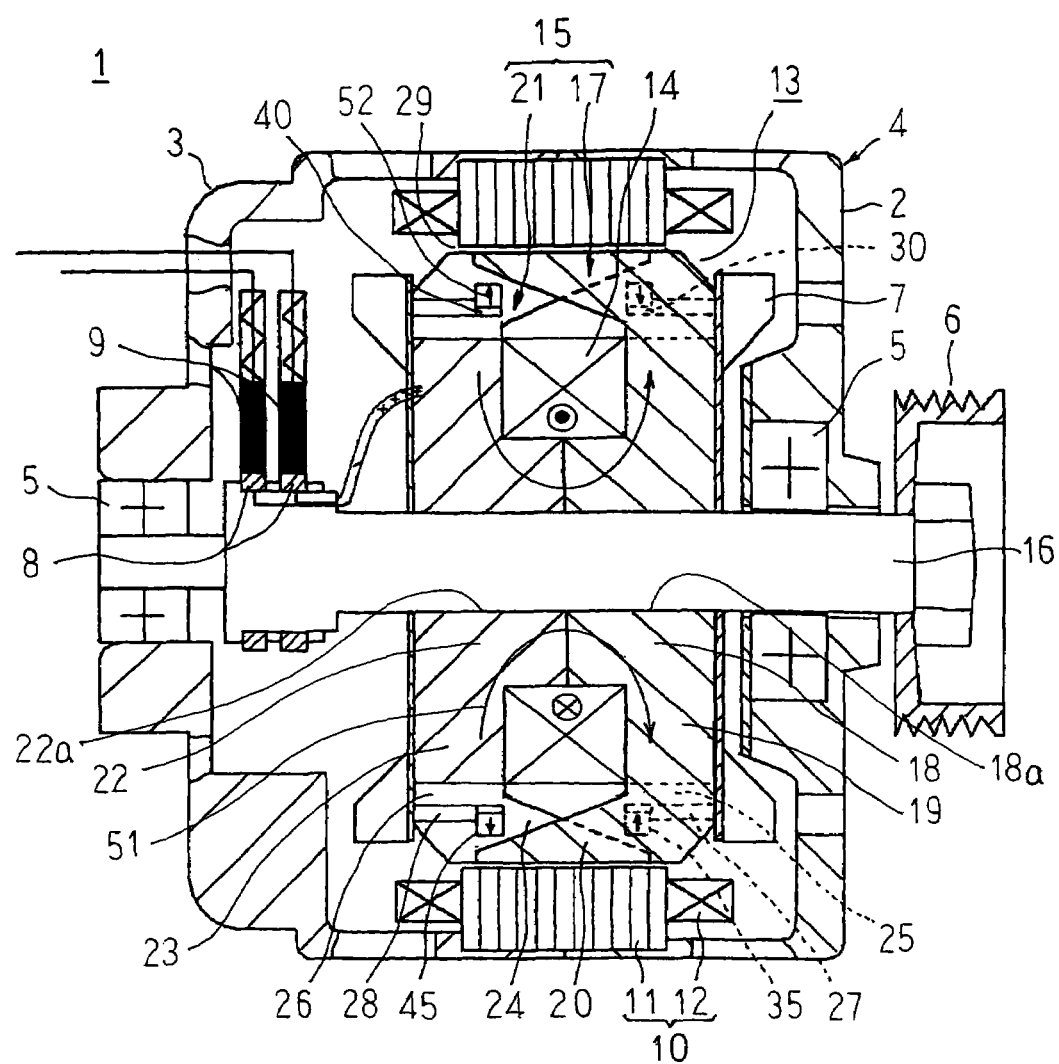
FIG. 1 is a cross section that schematically shows an automotive alternator according to Embodiment 1 of the present invention.
Figure 2:
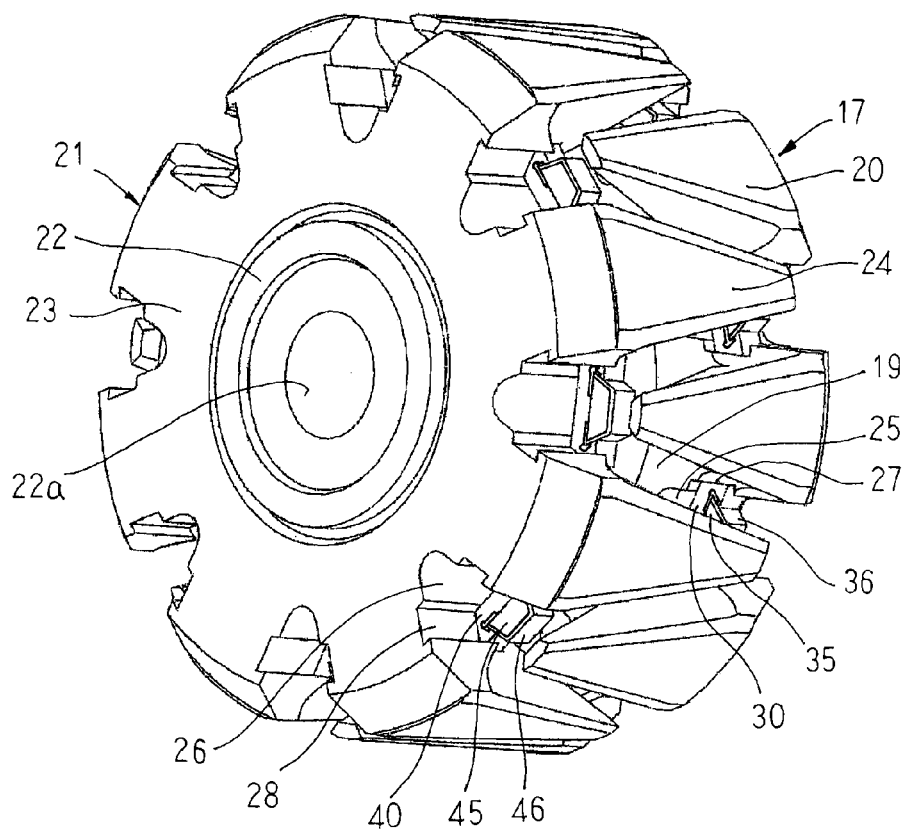
FIG. 2 is a perspective of a rotor that can be used in the automotive alternator according to Embodiment 1 of the present invention.
Figure 3:
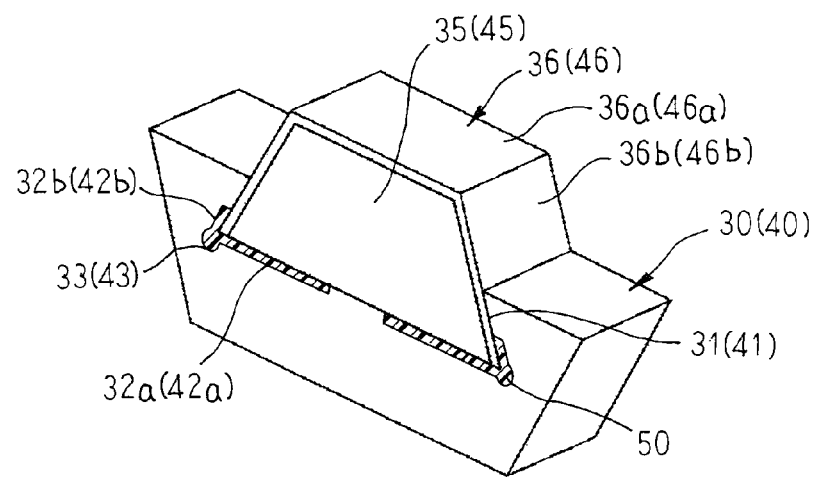
FIG. 3 is a perspective that shows a state in which a permanent magnet is mounted to a magnet holder in the automotive alternator according to Embodiment 1 of the present invention.
Figure 4:
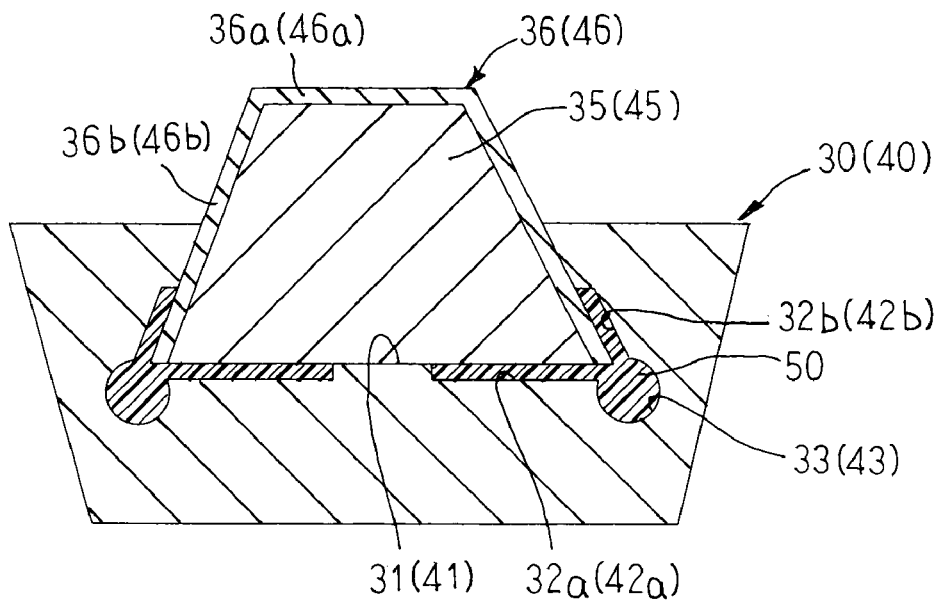
FIG. 4 is a cross section that shows the state in which the permanent magnet is mounted to the magnet holder in the automotive alternator according to Embodiment 1 of the present invention.
Figure 5:
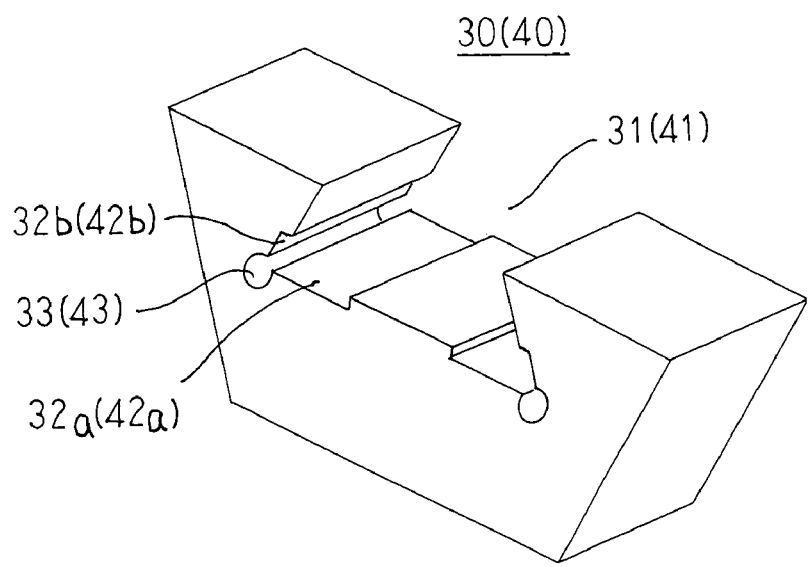
FIG. 5 is a perspective of the magnet holder that can be used in the automotive alternator according to Embodiment 1 of the present invention.

FIG. 1 is a cross section that schematically shows an automotive alternator according to Embodiment 1 of the present invention, FIG. 2 is a perspective of a rotor that can be used in the automotive alternator according to Embodiment 1 of the present invention, FIG. 3 is a perspective that shows a state in which a permanent magnet is mounted to a magnet holder in the automotive alternator according to Embodiment 1 of the present invention, FIG. 4 is a cross section that shows the state in which the permanent magnet is mounted to the magnet holder in the automotive alternator according to Embodiment 1 of the present invention, and FIG. 5 is a perspective of the magnet holder that can be used in the automotive alternator according to Embodiment 1 of the present invention.

In FIGS. 1 through 5, an automotive alternator 1 includes: a case 4 that is constituted by a front bracket 2 and a rear bracket 3 that are each made of aluminum so as to have an approximate cup shape; a rotor 13 that is rotatably disposed inside the case 4 such that a rotating shaft 16 is supported by means of bearings 5 in the case 4; a pulley 6 that is fixed to an end portion of the rotating shaft 16 that projects outward at a front end of the case 4; fans 7 that are fixed to first and second end surfaces in an axial direction of the rotor 13 (hereinafter "the axial direction"); a stator 10 that is fixed to the case 4 so as to surround an outer circumference of the rotor 13 so as to have a constant air gap 29 relative to the rotor 13; a pair of slip rings 8 that are fixed to a rear end of the rotating shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is installed in the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the rotating shaft 16 that is fitted through a central axial position of the pole core 15.

The pole core 15 is configured so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and in which a rotating shaft insertion aperture 18a is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. In addition, first trough portions 25 are recessed so as to have U shapes that curve convexly toward a radially-inner side, for example, at portions that are positioned between respective adjacent first claw-shaped magnetic pole portions 20 of the first yoke portion 19.

The second pole core body 21 has: a second boss portion 22 that has an outer circumferential surface that has a cylindrical shape, and in which a rotating shaft insertion aperture 22a is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially. In addition, second trough portions 26 are recessed so as to have U shapes that curve convexly toward a radially-inner side, for example, at portions that are positioned between respective adjacent second claw-shaped magnetic pole portions 24 of the second yoke portion 23.

The first and second pole core bodies 17 and 21 that are configured in this manner are fixed to the rotating shaft 16 that has been fitted through the rotating shaft insertion apertures 18a and 22a such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15. Furthermore, the tip ends of the first and second claw-shaped magnetic pole portions 20 and 24 overlap with the second and first yoke portions 23 and 19, respectively, in the axial direction.

A first magnet holder 30 is prepared so as to have a trapezoidal cross section that has a predetermined thickness using a magnetic material such as iron, or a ferromagnetic alloy, etc. A first receiving groove 31 that has a groove direction in a thickness direction of the first magnet holder 30 is recessed so as to have an opening on an upper surface of the first magnet holder 30. Here, upper and lower surfaces of the first magnet holder 30 and a bottom surface of the first receiving groove 31 are mutually parallel flat surfaces. The first receiving groove 31 is formed so as to have a wedge shape in which a groove width becomes gradually narrower toward the opening. Resin pooling grooves 32a are disposed so as to extend over entire regions of the first magnet holder 30 in the thickness direction at a predetermined depth and at a predetermined width on two sides of the bottom surface in a width direction of the first receiving groove 31. In addition, resin pooling grooves 32b are disposed so as to extend over entire regions of the first magnet holder 30 in the thickness direction at a predetermined depth and at a predetermined width on two side surfaces of the first receiving groove 31 near the bottom surface. First resin injection apertures 33 are disposed through the first magnet holder 30 so as to have an aperture direction in the thickness direction of the first magnet holder 30 and communicate with the resin pooling grooves 32a and 32b over entire regions in the thickness direction.

A first permanent magnet 35 is prepared so as to have an external shape that is slightly smaller than an internal shape of the first receiving groove 31, so as to have a trapezoidal cross section in a plane that is perpendicular to a thickness direction, and so as to have a thickness that is similar to that of the first magnet holder 30, and upper and lower surfaces of the first permanent magnet 35 are mutually parallel flat surfaces.

The first magnet cover 36 is constituted by: a flat, rectangular base portion 36a; and wing portions 36b that are disposed so as to extend from two opposite sides of the base portion 36a. The base portion 36a approximately matches a shape of the upper surface of the first permanent magnet 35, and the wing portions 36b approximately match shapes of the inclined surfaces of the trapezoidal cross section of the first permanent magnet 35. This first magnet cover 36 is mounted onto the first permanent magnet 35 by placing the base portion 36a on the upper surface of the first permanent magnet 35, and placing the pair of wing portions 36b alongside respective inclined surfaces of the trapezoidal cross section of the first permanent magnet 35. A lower end portion of the first permanent magnet 35 is fitted into the first receiving groove 31 such that the thickness direction of the first permanent magnet 35 is oriented in the thickness direction of the first magnet holder 30. At this point, the first permanent magnet 35 is held by the first magnet holder 30 by fitting the pair of wing portions 36b between the respective side surfaces of the first receiving groove 31 and the inclined surfaces of the first permanent magnet 35.

Here, the resin pooling grooves 32a and 32b constitute adhesive spaces that are bounded by the lower surface of the first permanent magnet 35, the external surfaces of the wing portions 36b, and the first receiving groove 31. A resin material 50 such as an epoxy resin, etc., for example, is injected into the first resin injection apertures 33 so as to fill the resin pooling grooves 32a and 32b. The first permanent magnet 35 and the first magnet cover 36 are fixed to the first magnet holder 30 by hardening the resin material 50 that has been injected inside the resin pooling grooves 32a and 32b. Thus, the bottom surface of the first receiving groove 31 and the lower surface of the first permanent magnet 35 face each other in close contact or so as to have a minute gap, and the first magnet holder 30 and the first permanent magnet 35 are connected magnetically. The first permanent magnet 35 is also covered by the first magnet cover 36.

A second magnet holder 40 is prepared into an identical shape as the first magnet holder 30 using an identical material. A second receiving groove 41, resin pooling grooves 42a and 42b, and second resin injection apertures 43 are formed into a second magnet holder 40 in a similar manner to the first receiving groove 31, the resin pooling grooves 32a and 32b, and the first resin injection apertures 33. A second permanent magnet 45 is prepared into an identical shape as the first permanent magnet 35 using an identical material. A second magnet cover 46 is prepared into an identical shape as the first magnet cover 36 using an identical material. A lower end portion of the second permanent magnet 45 is fitted into the second receiving groove 41 with the second magnet cover 36 mounted thereto such that the thickness direction of the second permanent magnet 45 is oriented in the thickness direction of the second magnet holder 40. At this point, the second permanent magnet 45 is held by the second magnet holder 40 by fitting a pair of wing portions 46b between the respective side surfaces of the second receiving groove 41 and the inclined surfaces of the second permanent magnet 45.

Here, the resin pooling grooves 42a and 42b constitute adhesive spaces that are bounded by the lower surface of the second permanent magnet 45, the external surfaces of the wing portions 46b, and the second receiving groove 41. A resin material 50 such as an epoxy resin, etc., for example, is injected into the second resin injection apertures 43 so as to fill the resin pooling grooves 42a and 42b. The second permanent magnet 45 and the second magnet cover 46 are fixed to the second magnet holder 40 by hardening the resin material 50 that has been injected inside the resin pooling grooves 42a and 42b. Thus, the bottom surface of the second receiving groove 41 and the lower surface of the second permanent magnet 45 face each other in close contact or so as to have a minute gap, and the second magnet holder 40 and the second permanent magnet 45 are connected magnetically. The second permanent magnet 45 is also covered by the second magnet cover 46.

First holding grooves 27 are recessed from a first end toward a second end of the first yoke portion 19 near roots of respective first claw-shaped magnetic pole portions 20 of the first pole core body 17 so as to have openings at respective portions that face toward upper portions of inner walls surfaces of the respective first trough portions 25 and so as to have a groove direction in the axial direction. Similarly, second holding grooves 28 are recessed from a second end toward a first end of the second yoke portion 23 near roots of respective second claw-shaped magnetic pole portions 24 of the second pole core body 21 so as to have openings at respective portions that face toward upper portions of inner walls surfaces of the respective second trough portions 26 and so as to have a groove direction in the axial direction. Here, the first and second holding grooves 27 and 28 are formed by broaching, or end milling, etc., so as to have groove shapes into which the first and second side portions of the first and second magnet holders 30 and 40 can be fitted.

The first magnet holders 30 are mounted to the first pole core body 17 by being press-fitted into the facing first holding grooves 27 from axially outside with the first permanent magnets 35 oriented upward so as to be magnetically connected when disposed so as to span each of the first trough portions 25, adhesive being applied if required. At that point, the thickness directions of the first magnet holders 30 and the first permanent magnets 35 are oriented in the axial direction. The base portions 36a of the first magnet covers 36 that cover the upper surfaces of the first permanent magnets 35 face inner circumferential surfaces near the tip ends of the second claw-shaped magnetic pole portions 24 so as to leave a predetermined clearance.

The second magnet holders 40 are mounted to the second pole core body 21 by being press-fitted into the facing second holding grooves 28 from axially outside with the second permanent magnets 45 oriented upward so as to be magnetically connected when disposed so as to span each of the second trough portions 26, applying adhesive if required. At that point, the thickness directions of the second magnet holders 40 and the second permanent magnets 45 are oriented in the axial direction. The base portions 46a of the second magnet covers 46 that cover the upper surfaces of the second permanent magnets 45 face inner circumferential surfaces near the tip ends of the first claw-shaped magnetic pole portions 20 so as to leave a predetermined clearance.

As shown in FIG. 1, the first and second permanent magnets 35 and 45 are magnetically oriented in a reverse direction to the orientation of a magnetic field 51 that is generated by passing an electric current through the field coil 14. Extensions of the directions of magnetization 52 of the first and second permanent magnets 35 and 45 are directed at inner circumferential surfaces near the tip ends of the facing second and first claw-shaped magnetic pole portions 24 and 20. Moreover, in the case of a design in which the orientation of the magnetic field 51 that the field current that flows through the field coil 14 produces is inverted, the first and second permanent magnets 35 and 45 will also be magnetically oriented in a reverse direction.

Next, operation of an automotive alternator 1 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the rotating shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Magnetic flux that has been generated when the current is passed through the field coil 14 enters tooth portions of the stator core 11 by passing through the air gap 29 from the first claw-shaped magnetic pole portions 20. The magnetic flux that has entered the stator core 11 then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In the present rotor 13, the first and second permanent magnets 35 and 45 are magnetically oriented so as to be opposite to the orientation of the magnetic field 51 that is generated by the field coil 14. Thus, magnetic flux that originates from the first permanent magnets 35 enters the first magnet holders 30. Here, the first trough portions 25, i.e., large spaces, are present below the first magnet holders 30. Thus, the magnetic flux that has entered the first magnet holders 30 flows through the first magnet holders 30 in two circumferential directions and enters the first yoke portion 19, passes through the first boss portion 18, the second boss portion 22, the second yoke portion 23, and the second claw-shaped magnetic pole portions 24, and returns to the first permanent magnets 35 across an air gap. The magnetic flux that originates from the second permanent magnets 45 enters the first claw-shaped magnetic pole portions 20 across the air gap, passes through the first yoke portion 19, the first boss portion 18, and the second boss portion 22, and enters the second yoke portion 23. The magnetic flux that has entered the second yoke portion 23 flows radially outward through two sides of the second trough portions 26 of the second yoke portion 23, enters the second magnet holders 40 from two ends of the second magnet holders 40, and returns to the second permanent magnets 45.

The magnetic flux that originates from the first and second permanent magnets 35 and 45 is in a reverse direction from the magnetic flux that originates from the field coil 14, enabling the magnetic flux density of the magnetic bodies that constitute the first and second pole core bodies 17 and 21 to be reduced significantly, thereby enabling magnetic saturation to be relieved.

By adapting the arrangement and direction of magnetization 52 of the first and second permanent magnets 35 and 45 in the present rotor 13 in this manner, magnetic saturation of the first and second pole core bodies 17 and 21 by the magnetic field that originates from the field coil 14 is alleviated. Thus, the magnetic flux that interacts with the stator 10 is increased, enabling generated power to be increased.

Because the first and second permanent magnets 35 and 45 are disposed so as to face the inner circumferential surfaces near the tip ends of the second and first claw-shaped magnetic pole portions 24 and 20, the magnetic circuits of the first and second permanent magnets 35 and 45 are closed magnetic circuits inside the rotor 13. Thus, magnetic flux components that interlink with the stator 10 among the magnetic flux that originates from the first and second permanent magnets 35 and 45 (leakage flux) are reduced. Thus, magnetic flux components that interlink with the stator 10 among the magnetic flux that originates from the first and second permanent magnets 35 and 45 (leakage flux) are reduced. In addition, because extensions of the directions of magnetization 52 are directed at inner circumferential surfaces near the tip ends of the facing second and first claw-shaped magnetic pole portions 24 and 20, leakage flux is reduced even further. As a result, the occurrence of voltages induced by the first and second permanent magnets 35 and 45 during no-load de-energization is suppressed.

According to Embodiment 1, resin pooling grooves 32a and 42a are disposed so as to extend over entire regions of the first and second magnet holders 30 and 40 in the thickness direction at a predetermined depth and at a predetermined width on two sides of the bottom surfaces in a width direction of the first and second receiving grooves 31 and 41. In addition, resin pooling grooves 32b and 42b are disposed so as to extend over entire regions of the first and second magnet holders 30 and 40 in the thickness direction at a predetermined depth and at a predetermined width on two side surfaces of the first and second receiving grooves 31 and 41 near the bottom surfaces. The first and second resin injection apertures 33 and 43 are disposed through the first and second magnet holders 30 and 40 so as to have an aperture direction in the thickness direction of the first and second magnet holders 30 and 40 and connect with the resin pooling grooves 32a, 32b, 42a, and 42b over entire regions in the thickness direction.

Thus, when the first and second permanent magnets 35 and 45 onto which the first and second magnet covers 36 and 46 have been mounted are fitted into the first and second receiving grooves 31 and 41, the resin pooling grooves 32a, 32b, 42a, and 42b constitute adhesive spaces that are bounded by the first and second receiving grooves 31 and 41, the first and second magnet covers 36 and 46, and the first and second permanent magnets 35 and 45. These adhesive spaces extend over entire regions of the first and second magnet holder 30 and 40 in the thickness direction at a predetermined depth. In addition, the first and second resin injection apertures 33 and 43 are connected to the adhesive spaces over entire regions of the first and second magnet holders 30 and 40 in the thickness direction.

Thus, by injecting the resin material 50 into the first and second resin injection apertures 33 and 43, the adhesive spaces can be filled with an ample amount of resin material 50 without leaving gaps. At this point, external surfaces near leading ends of the wing portions 36b and 46b of the first and second magnet covers 36 and 46 contact the resin material 50 over entire regions in the thickness direction at a predetermined width. Similarly, lower surfaces of the first and second permanent magnets 35 and 45 contact the resin material 50 at a predetermined width over entire regions in the thickness direction. Thus, the first and second permanent magnets 35 and 45 and the first and second magnet covers 36 and 46 are fixed firmly to the first and second magnet holders 30 and 40, suppressing the occurrence of noise that results from wobbling of the first and second permanent magnets 35 and 45, and also preventing the first and second permanent magnets 35 and 45 from dislodging. Furthermore, it is not necessary to apply the resin material 50 to the first and second permanent magnets 35 and 45 and the first and second magnet covers 36 and 46 before a process of installing the first and second permanent magnets 35 and 45 and the first and second magnet covers 36 and 46 in the first and second magnet holders 30 and 40, facilitating handling of the first and second permanent magnets 35 and 45 and the first and second magnet covers 36 and 46, and enabling mass producibility to be increased.

In addition, because the first and second magnet covers 36 and 46 cover the first and second permanent magnets 35 and 45, the occurrence of damage to the first and second permanent magnets 35 and 45 is suppressed. Even if the first and second permanent magnets 35 and 45 are damaged, throwing of the first and second permanent magnets 35 and 45 is suppressed.

Moreover, it is preferable to use sintered rare-earth magnets such as neodymium-iron-boron magnets, samarium-cobalt magnets, etc., that have a high magnetic flux density for the first and second permanent magnets 35 and 45.

The first and second magnet covers 36 and 46 need only function to protect the first and second permanent magnets 35 and 45, and plastics, nonmagnetic metals such as stainless alloys, etc., or magnetic metals such as mild steels, etc., can be used.

The first and second magnet holders 30 and 40 are disposed so as to span the first and second trough portions 25 and 26, but if there are no first and second trough portions, the first and second magnet holders may also be held directly on outer circumferential surfaces of the first and second yoke portions.

The first and second resin injection apertures 33 and 43 are formed on the first and second magnet holders 30 and 40 so as to have aperture directions in the thickness directions of the first and second magnet holders 30 and 40, but the aperture directions of the first and second resin injection apertures are not limited to the thickness directions of the first and second magnet holders, and the resin pooling grooves 32a and 32b (42a and 42b) may also be formed so as to be connected over at least predetermined regions in the thickness direction, and first resin injection apertures (second resin injection apertures) formed so as to reach the connected portions of the resin pooling grooves 32a and 32b (42a and 42b) from lower surfaces of the first and second magnet holders, for example.

The first and second permanent magnets 35 and 45 are formed so as to have trapezoidal cross sections that have a predetermined thickness, but the first and second permanent magnets 35 and 45 are not limited to a particular cross-sectional shape provided that they can be fitted into and held by the first and second magnet holders 30 and 40. Similarly, the first and second magnet holders 30 and 40 are formed so as to have trapezoidal cross sections that have a predetermined thickness, but the first and second magnet holders 30 and 40 are not limited to a particular cross-sectional shape provided that they can be fitted into and held by the first and second holding grooves 27 and 28.

Embodiment 2

Figure 6:
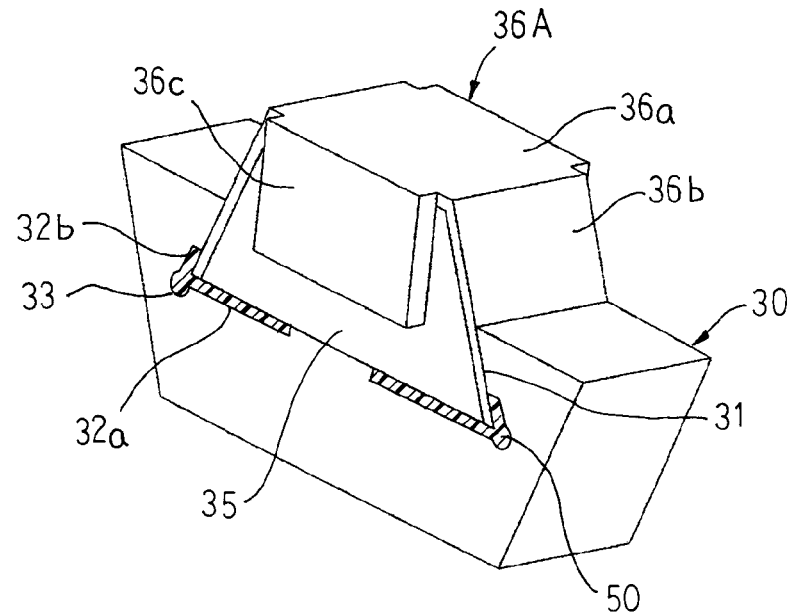
FIG. 6 is a perspective that shows a state in which a permanent magnet is mounted to a magnet holder in an automotive alternator according to Embodiment 2 of the present invention.

As shown in FIG. 6, Embodiment 2 is configured in a similar manner to Embodiment 1 above except for the fact that a first magnet cover 36A is used in which a pair of protective sides 36c are disposed so as to extend from two remaining opposite sides of the base portion 36a. Moreover, because a second magnet cover is also configured in a similar manner to the first magnet cover, only a first permanent magnet fixing construction will be explained here.

In Embodiment 2, a first magnet cover 36A is constituted by: a base portion 36a; a pair of wing portions 36b that are disposed so as to extend from two sides of the base portion 36a that face each other; and a pair of protective sides 36c that are disposed so as to extend from two remaining opposite sides of the base portion 36a. The first magnet cover 36A is mounted onto the first permanent magnet 35 by placing the base portion 36a on the upper surface of the first permanent magnet 35, bending the pair of wing portions 36b so as to be placed alongside respective inclined surfaces of the trapezoidal cross section of the first permanent magnet 35, and bending the pair of protective sides 36c so as to be placed alongside end surfaces of the first permanent magnet 35. The first permanent magnet 35 is held by the first magnet holder 30 by fitting the pair of wing portions 36b between the respective side surfaces of the first receiving groove 31 and the inclined surfaces of the first permanent magnet 35. In addition, the first permanent magnet 35 and the first magnet cover 36A are fixed to the first magnet holder 30 by filling resin pooling grooves 32a and 32b with a resin material 50 through first resin injection apertures 33.

Consequently, similar effects to those in Embodiment 1 above can also be achieved in Embodiment 2.

According to Embodiment 2, because the end surfaces of the first permanent magnet 35 in the thickness direction are covered by the protective sides 36c of the first magnet cover 36A, the occurrence of damage to and throwing of the first permanent magnet 35 can be suppressed further.

Embodiment 3

Figure 7:
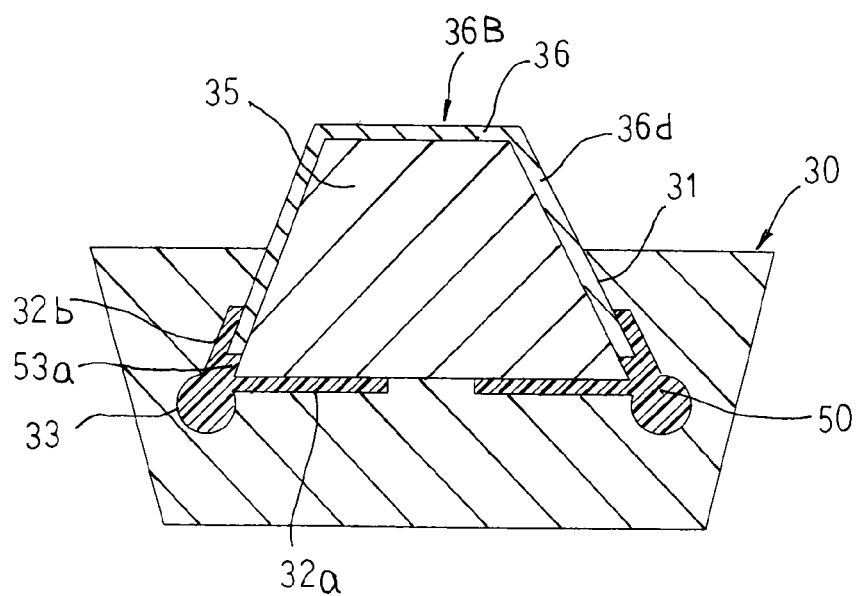
FIG. 7 is a cross section that shows a state in which a permanent magnet is mounted to a magnet holder in an automotive alternator according to Embodiment 3 of the present invention.

As shown in FIG. 7, Embodiment 3 is configured in a similar manner to Embodiment 1 above except for the fact that a first magnet cover 36B is used in which a pair of wing portions 36d are disposed so as to extend from two opposite sides of the base portion 36a to lengths that are shorter than lengths of inclined surfaces of a first permanent magnet 35. Moreover, because a second magnet cover is also configured in a similar manner to the first magnet cover, only a first permanent magnet fixing construction will be explained here.

In Embodiment 3, a first magnet cover 36B is constituted by: a base portion 36a; and a pair of wing portions 36d that are disposed so as to extend from two opposite sides of the base portion 36a, and that have lengths of projection that are shorter than lengths of inclined surfaces of a first permanent magnet 35. The first magnet cover 36B is mounted onto the first permanent magnet 35 by placing the base portion 36a on the upper surface of the first permanent magnet 35, and bending the pair of wing portions 36d so as to be placed alongside the respective inclined surfaces of the trapezoidal cross section of the first permanent magnet 35. The first permanent magnet 35 is held by the first magnet holder 30 by fitting the pair of wing portions 36d between the respective side surfaces of the first receiving groove 31 and the inclined surfaces of the first permanent magnet 35. At this point, lower end portions of the inclined surfaces of the first permanent magnet 35 are exposed below the leading ends of the wing portions 36d, and spaces 53a are formed between these exposed portions of the first permanent magnet 35 and resin pooling grooves 32b. Together with the resin pooling grooves 32a and 32b, these spaces 53a constitute adhesive spaces. In addition, the first permanent magnet 35 and the first magnet cover 36B are fixed to the first magnet holder 30 by filling the adhesive spaces with a resin material 50 through first resin injection apertures 33.

Consequently, similar effects to those in Embodiment 1 above can also be achieved in Embodiment 3.

Because the portions of the inclined surfaces of the first permanent magnet 35 that are exposed below the wing portions 36b contact the resin material 50, the bonding area of the first permanent magnet 35 is increased, further suppressing wobbling of the first permanent magnet 35.

Embodiment 4

Figure 8:
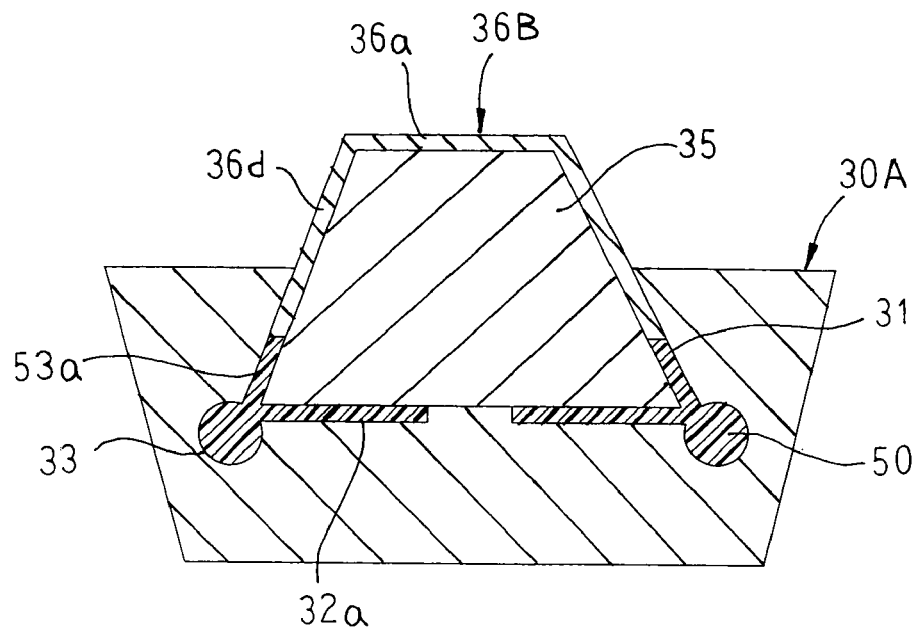
FIG. 8 is a cross section that shows a state in which a permanent magnet is mounted to a magnet holder in an automotive alternator according to Embodiment 4 of the present invention.

As shown in FIG. 8, Embodiment 4 is configured in a similar manner to Embodiment 3 above except for the fact that a first magnet holder 30A is used in which resin pooling grooves 32b are omitted and only resin pooling grooves 32a are formed. Moreover, because a second magnet holder is also configured in a similar manner to the first magnet holder, only a first permanent magnet fixing construction will be explained here.

In Embodiment 4, resin pooling grooves 32a are only recessed in a bottom surface of a first receiving groove 31 of a first magnet holder 30A. A first magnet cover 36B is mounted onto a first permanent magnet 35 by placing a base portion 36a on an upper surface of the first permanent magnet 35, and bending a pair of wing portions 36d so as to be placed alongside respective inclined surfaces of a trapezoidal cross section of the first permanent magnet 35. The first permanent magnet 35 is held by the first magnet holder 30A by fitting the pair of wing portions 36d between respective side surfaces of the first receiving groove 31 and the inclined surfaces of the first permanent magnet 35. At this point, lower end portions of the inclined surfaces of the first permanent magnet 35 are exposed below the leading ends of the wing portions 36d, and spaces 53a are formed between these exposed portions of the first permanent magnet 35 and side surfaces of the first receiving groove 31. Adhesive spaces are constituted by these space 53a and the resin pooling grooves 32a. In addition, the first permanent magnet 35 and the first magnet cover 36B are fixed to the first magnet holder 30A by filling the resin pooling grooves 32a with a resin material 50 through first resin injection apertures 33.

Consequently, similar effects to those in Embodiment 3 above can also be achieved in Embodiment 4.

Because the resin pooling grooves 32b are omitted, costs for manufacturing the first magnet holder 30A can be reduced proportionately.

Embodiment 5

Figure 9:
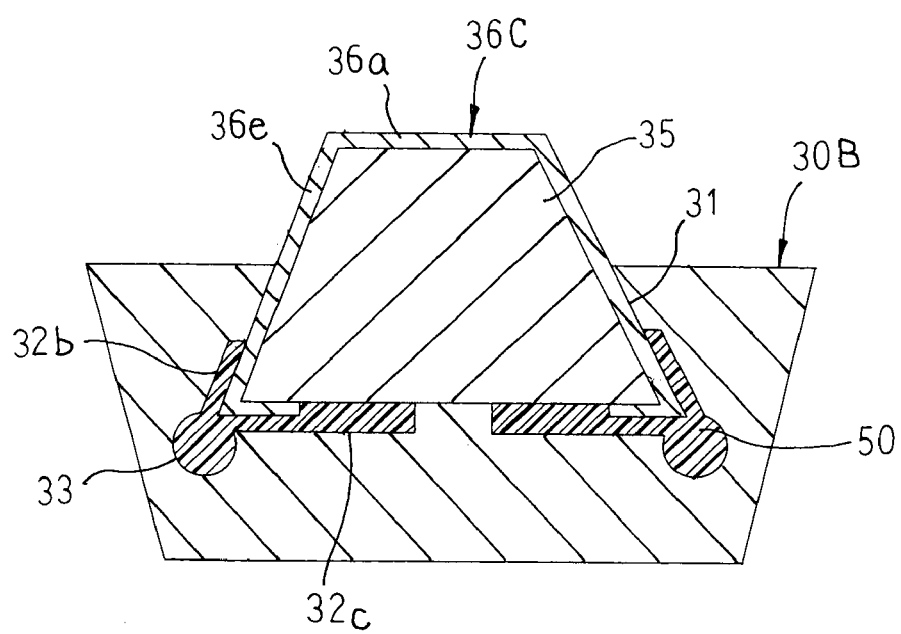
FIG. 9 is a cross section that shows a state in which a permanent magnet is mounted to a magnet holder in an automotive alternator according to Embodiment 5 of the present invention.

As shown in FIG. 9, Embodiment 5 is configured in a similar manner to Embodiment 1 above except for the fact that a first magnet cover 36C is used in which a pair of wing portions 36e are disposed so as to extend from two opposite sides of the base portion 36a to lengths that are longer than lengths of inclined surfaces of a first permanent magnet 35, and a first magnet holder 30B is used in which resin pooling grooves 32c are formed so as to be deeper by an amount equivalent to the thickness of the first magnet cover 36C. Moreover, because a second magnet cover and a second magnet holder are also configured in a similar manner to the first magnet cover and the first magnet holder, only a first permanent magnet fixing construction will be explained here.

In Embodiment 5, a first magnet cover 36C is constituted by: a base portion 36a; and a pair of wing portions 36e that are disposed so as to extend from two opposite sides of the base portion 36a, and that have lengths of projection that are longer than lengths of inclined surfaces of a first permanent magnet 35. Resin pooling grooves 32c and resin pooling grooves 32b are respectively recessed on side surfaces and a bottom surface of a first receiving groove 31 of a first magnet holder 30B. The resin pooling grooves 32c are formed so as to be deeper than the resin pooling grooves 32a by an amount equivalent to a thickness of the first magnet cover 36C. The first magnet cover 36C is mounted onto a first permanent magnet 35 by placing the base portion 36a on an upper surface of the first permanent magnet 35, bending the pair of wing portions 36e so as to be placed alongside the respective inclined surfaces of a trapezoidal cross section of the first permanent magnet 35, and in addition bending leading end portions of the pair of wing portions 36e so as to be placed alongside a lower surface of the first permanent magnet 35. The first permanent magnet 35 is held by the first magnet holder 30B by fitting the pair of wing portions 36e between the respective side surfaces of the first receiving groove 31 and the inclined surfaces of the first permanent magnet 35. In addition, the first permanent magnet 35 and the first magnet cover 36C are fixed to the first magnet holder 30B by filling resin pooling grooves 32b and 32c with a resin material 50 through first resin injection apertures 33.

Consequently, similar effects to those in Embodiment 1 above can also be achieved in Embodiment 5.

Because the leading end portions of the wing portions 36e of the first magnet cover 36C are bent so as to lie alongside the lower surface of the first permanent magnet 35, the first magnet cover 36C is reliably prevented from being pulled out.

Embodiment 6

Figure 10:
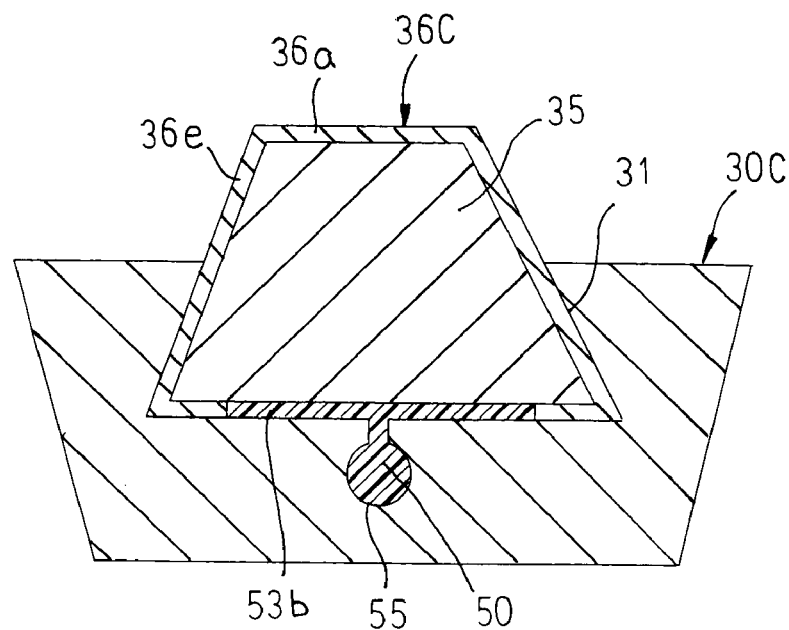
FIG. 10 is a cross section that shows a state in which a permanent magnet is mounted to a magnet holder in an automotive alternator according to Embodiment 6 of the present invention.

As shown in FIG. 10, Embodiment 6 is configured in a similar manner to Embodiment 5 above except for the fact that resin pooling grooves 32a and 32b are omitted, and a first resin injection aperture 55 is disposed through a first magnet holder 30C at a central position in a width direction of the first magnet holder 30C so as to have an aperture direction in a thickness direction of the first magnet holder 30C and so as to have an opening on a bottom face of a first receiving groove 31 over an entire region in the thickness direction. Moreover, because a second magnet holder is also configured in a similar manner to the first magnet holder, only a first permanent magnet fixing construction will be explained here.

In Embodiment 6, a first magnet cover 36C is mounted onto a first permanent magnet 35 by placing a base portion 36a on an upper surface of the first permanent magnet 35, bending a pair of wing portions 36e so as to be placed alongside respective inclined surfaces of a trapezoidal cross section of the first permanent magnet 35, and in addition bending leading end portions of the pair of wing portions 36e so as to be placed alongside a lower surface of the first permanent magnet 35. The first permanent magnet 35 is held by a first magnet holder 30C by fitting the pair of wing portions 36e between respective side surfaces and a bottom surface of a first receiving groove 31 and the inclined surfaces of the first permanent magnet 35. Here, a gap 53b that is surrounded by the lower surface of the first permanent magnet 35, the leading end surfaces of the wing portions 36e of the first magnet cover 36C, and the bottom surface of the first receiving groove 31 constitutes an adhesive space. In addition, the first permanent magnet 35 and the first magnet cover 36C are fixed to the first magnet holder 30C by filling the gap 53b with a resin material 50 through a first resin injection aperture 55.

Consequently, similar effects to those in Embodiment 5 above can also be achieved in Embodiment 6.

In Embodiment 6, because it is not necessary to form resin pooling grooves 32a and 32b, and only one first resin injection aperture 55 is required, reductions in costs for manufacturing the magnet holder are enabled, and a resin injection process is also simplified, improving mass producibility.

Embodiment 7

Figure 11:
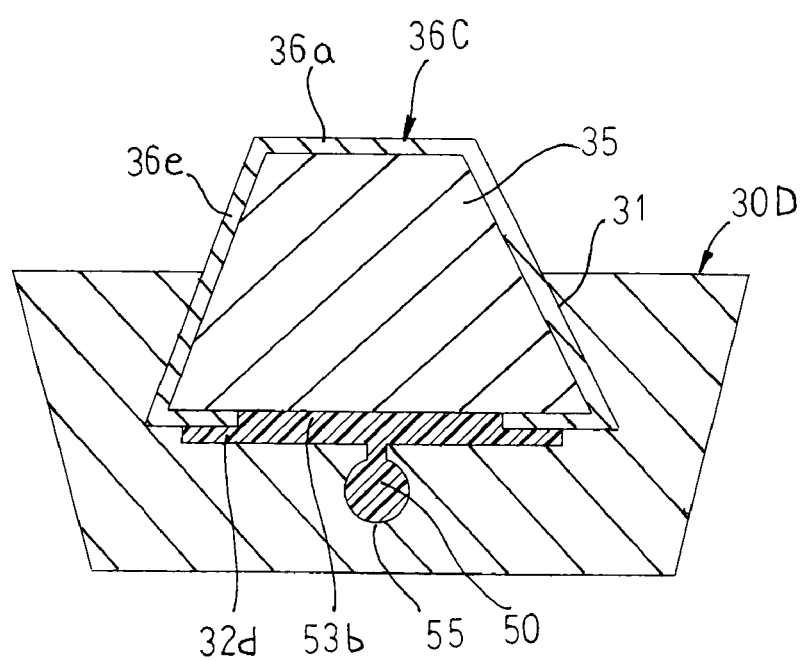
FIG. 11 is a cross section that shows a state in which a permanent magnet is mounted to a magnet holder in an automotive alternator according to Embodiment 7 of the present invention.

As shown in FIG. 11, Embodiment 7 is configured in a similar manner to Embodiment 6 above except for the fact that a resin pooling groove 32d is recessed into a bottom surface of a first receiving groove 31 of a first magnet holder 30D so as to face outer surfaces near tip ends of bent wing portions 36e. Moreover, because a second magnet holder is also configured in a similar manner to the first magnet holder, only a first permanent magnet fixing construction will be explained here.

In Embodiment 7, a first magnet cover 36C is mounted onto a first permanent magnet 35 by placing a base portion 36a on an upper surface of the first permanent magnet 35, bending a pair of wing portions 36e so as to be placed alongside respective inclined surfaces of a trapezoidal cross section of the first permanent magnet 35, and in addition bending leading end portions of the pair of wing portions 36e so as to be placed alongside a lower surface of the first permanent magnet 35. The first permanent magnet 35 is held by a first magnet holder 30D by fitting the pair of wing portions 36e between respective side surfaces and a bottom surface of a first receiving groove 31 and the inclined surfaces of the first permanent magnet 35. Here, the resin pooling groove 32d and a gap 53b that is formed so as to be surrounded by the lower surface of the first permanent magnet 35, leading end surfaces of the wing portions 36e of the first magnet cover 36C, and the bottom surface of the first receiving groove 31 constitute an adhesive space. In addition, the first permanent magnet 35 and the first magnet cover 36C are fixed to the first magnet holder 30D by filling the resin pooling groove 32d and the gap 53b with a resin material 50 through a first resin injection aperture 55.

Consequently, similar effects to those in Embodiment 6 above can also be achieved in Embodiment 7.

In Embodiment 7, because the resin pooling groove 32d is formed in addition to the space 53b, the adhesive space is enlarged, increasing the amount of resin material 50 and enabling the first permanent magnet 35 and the first magnet cover 36C to be fixed to the first magnet holder 30D firmly.

Embodiment 8

Figure 12:
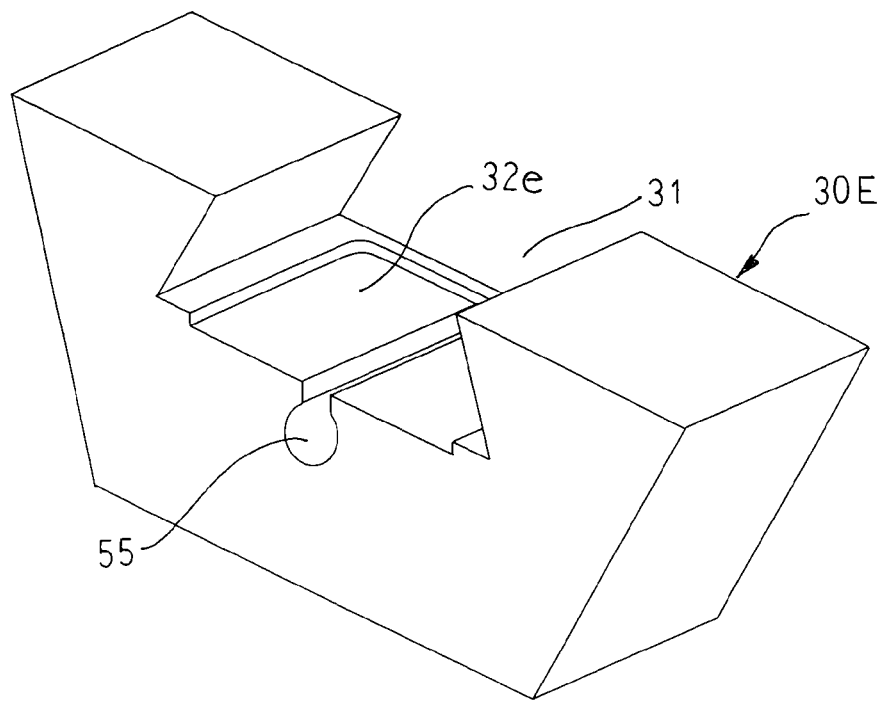
FIG. 12 is a perspective of a magnet holder that can be used in the automotive alternator according to Embodiment 8 of the present invention.

As shown in FIG. 12, Embodiment 8 is configured in a similar manner to Embodiment 7 above except for the fact that a resin pooling groove 32d is recessed into a bottom surface of a first receiving groove 31 of a first magnet holder 30E so as to close off a second end in a thickness direction. Moreover, because a second magnet holder is also configured in a similar manner to the first magnet holder, only a first permanent magnet fixing construction will be explained here.

In Embodiment 7 above, because the resin pooling groove 32d is recessed into the bottom surface of the first receiving groove 31 of the first magnet holder 30D so as to pass through in the thickness direction, the resin material 50 that has filled the resin pooling groove 32d from a first end of the first resin injection aperture 55 is easily scattered from a second end of the resin pooling groove 32d.

In Embodiment 8, because the second end of the resin pooling groove 32e is closed, scattering from the second end of the resin pooling groove 32e of the resin material 50 that has filled the resin pooling groove 32e from the first resin injection aperture 55 can be suppressed.

Embodiment 9

Figure 13:
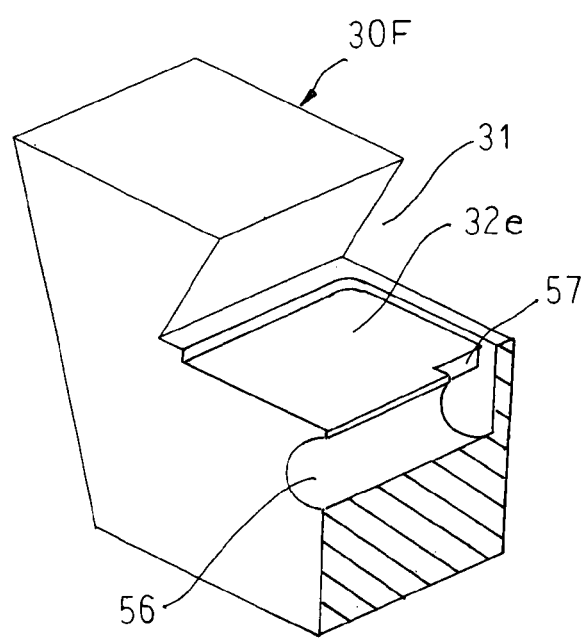
FIG. 13 is a cutaway perspective of a magnet holder that can be used in the automotive alternator according to Embodiment 9 of the present invention.

As shown in FIG. 13, Embodiment 9 is configured in a similar manner to Embodiment 8 above except for the fact that a first magnet holder 30F is used in which a second end of a first resin injection aperture 56 is closed, and only the second end of the first resin injection aperture 56 is connected to a resin pooling groove 32e by means of an opening 57.

In Embodiment 9, because the second end of the first resin injection aperture 56 is closed, the resin material 50 that has been injected from the first end of the first resin injection aperture 56 will not be scattered at the second end of the first resin injection aperture 56. In addition, because the second end of the first resin injection aperture 56 is connected to the resin pooling groove 32e over a predetermined range in an axial direction by means of the opening 57, the resin material 50 that has been injected as far as the second end of the first resin injection aperture 56 flows into the resin pooling groove 32d through the opening 57. Thus, the resin material 50 that has flowed into the resin pooling groove 32e gradually progresses from the second end to the first end while filling up the resin pooling groove 32e, and eventually reaches the first end of the resin pooling groove 32e.

Consequently, according to Embodiment 9, scattering of the resin material 50 from the second end of the first resin injection aperture 56 is eliminated, enabling the resin material 50 to be made to flow reliably into the resin pooling groove 32e. Because only the second end of the first resin injection aperture 56 is connected to the second end of the resin pooling groove 32e by means of the opening 57, the resin material 50 that has flowed into the resin pooling groove 32e from the opening 57 moves from the second end toward the first end while filling the resin pooling groove 32e. Thus, the occurrence of air pockets is suppressed, enabling the resin material 50 to fill the resin pooling groove 32e without leaving gaps. In addition, by checking when the resin material 50 has reached the first end of the resin pooling groove 32e then stopping injection of the resin material 50, scattering of the resin material 50 from the first end of the resin pooling groove 32e can be reliably prevented.

Embodiment 10

Figure 14:
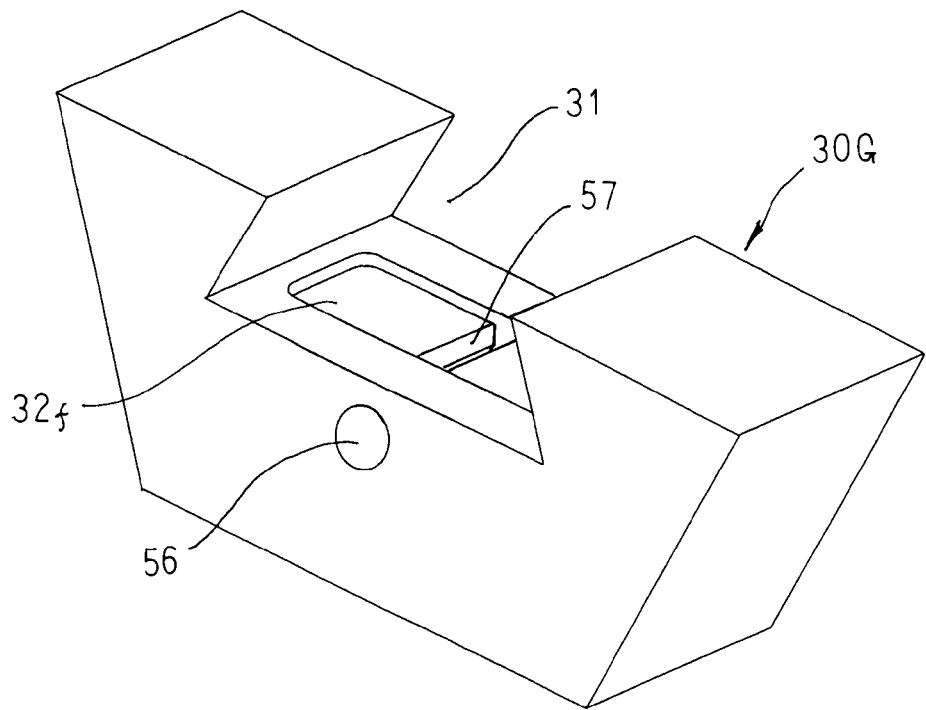
FIG. 14 is a perspective of a magnet holder that can be used in the automotive alternator according to Embodiment 10 of the present invention.
Figure 15:
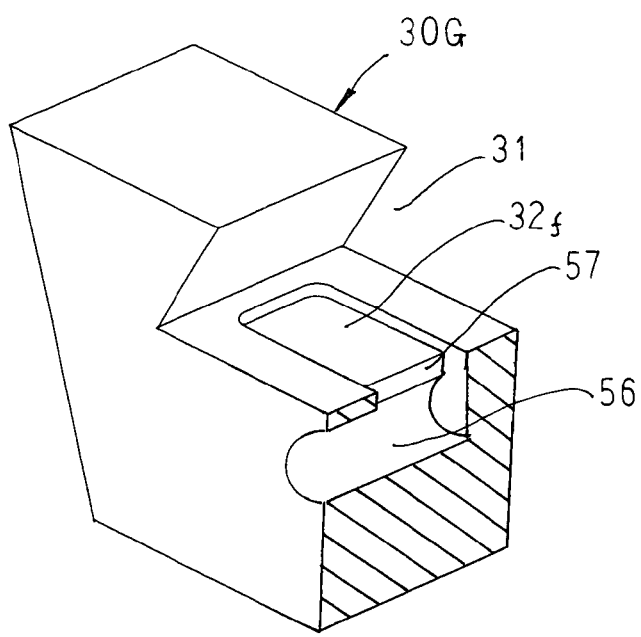
FIG. 15 is a cutaway perspective of a magnet holder that can be used in the automotive alternator according to Embodiment 10 of the present invention.

As shown in FIGS. 14 and 15, Embodiment 10 is configured in a similar manner to Embodiment 9 above except for the fact that a first magnet holder 30G is used in which a resin pooling groove 32f is recessed into a bottom surface of a first receiving groove 31 of the first magnet holder 30G, and a first resin injection aperture 56 in which a second end is closed is connected to the resin pooling groove 32f by means of an opening 57.

In Embodiment 10, because the second end of the first resin injection aperture 56 is closed, the resin material 50 that has been injected from the first end of the first resin injection aperture 56 flows into the resin pooling groove 32f through the opening 57 and fills the resin pooling groove 32f without being scattered at the second end of the first resin injection aperture 56.

Consequently, similar effects to those in Embodiment 9 above can also be achieved in Embodiment 10.

Moreover, a plurality of resin pooling grooves 32f may also be disposed parallel to the thickness direction of the first magnet holder 30G, and the resin pooling groove 32f may also be disposed so as to extend from the bottom surface of the first receiving groove 31 to lower ends of the side surfaces.

Moreover, in each of the above embodiments, explanations are given for automotive alternators, but the present invention is not limited to automotive alternators, and similar effects are also exhibited if the present invention is applied to other dynamoelectric machines such as automotive electric motors, automotive generator-motors, etc.

In each of the above embodiments, magnet holders are disposed in all of the trough portions, but magnet holders may also be disposed in selected trough portions. In that case, it is preferable to dispose the magnet holders in a well-balanced manner circumferentially. For example, magnet holders may also be disposed in all of the trough portions of the second pole core body while not disposing any magnet holders in the first pole core body, or magnet holders may also be disposed in every second trough portion in a circumferential direction in both the first and second pole core bodies. Although adopting this kind of configuration reduces output slightly compared to when the magnet holders are disposed in all of the trough portions, the number of parts can be reduced, enabling output to be increased using an inexpensive configuration.

What is claimed is:

1. A dynamoelectric machine comprising:
   a rotor comprising:
      a pole core having:
         a boss portion;
         a pair of yoke portions that are disposed so as to extend radially outward from two axial end edge portions of said boss portion; and
         a plurality of claw-shaped magnetic pole portions that are disposed so as to extend in an axial direction alternately from each of said pair of yoke portions, and that are arranged circumferentially so as to intermesh with each other,
         said pole core being fixed to a rotating shaft that is inserted through a central axial position of said boss portion; and
      a field coil that is housed inside a space that is surrounded by said boss portion, said pair of yoke portions, and said plurality of claw-shaped magnetic pole portions;
   a stator that is disposed so as to surround an outer circumference of said rotor so as to form a predetermined air gap,
   a magnet holder that is held between circumferentially-adjacent claw-shaped magnetic pole portions of said pair of yoke portions, a receiving groove being recessed into an upper surface of said magnet holder so as to pass through in said axial direction;
   a permanent magnet that is mounted to said magnet holder by fitting together with said receiving groove so as to face an inner circumferential surface near a tip end of said claw-shaped magnetic pole portion;
   a magnet cover comprising:
      a base portion; and
      a pair of wing portions that are disposed so as to extend from two opposite sides of said base portion,
      said magnet cover being mounted to said permanent magnet such that an upper surface of said permanent magnet is covered by said base portion and said pair of wing portions are placed alongside two circumferential end surfaces of said permanent magnet, and being mounted to said magnet holder such that leading end portions of said pair of wing portions are fitted between said permanent magnet and said receiving groove;
   a resin material that fixes said permanent magnet and said magnet cover to said magnet holder by filling an adhesive space that is bounded by said permanent magnet, said magnet cover, and said receiving groove; and
   a resin injection aperture that is formed on said magnet holder so as to communicate between an external portion of said magnet holder and said adhesive space.

2. A dynamoelectric machine according to claim 1, wherein said resin injection aperture is formed on said magnet holder so as to have an opening on a first axial end surface of said magnet holder, and so as to have an aperture direction oriented in said axial direction, and is connected to said adhesive space over a predetermined range in said axial direction.

3. A dynamoelectric machine according to claim 2, wherein a second end of said resin injection aperture in said axial direction is closed.

4. A dynamoelectric machine according to claim 1, wherein said adhesive space has a resin pooling groove that is recessed into an inner wall surface of said receiving groove that faces an external surface of said permanent magnet.

5. A dynamoelectric machine according to claim 4, wherein said resin injection aperture is formed on said magnet holder so as to have an opening on a first axial end surface of said magnet holder, and so as to have an aperture direction oriented in said axial direction, and is connected to said adhesive space over a predetermined range in said axial direction.

6. A dynamoelectric machine according to claim 5, wherein a second end of said resin injection aperture in said axial direction is closed.

7. A dynamoelectric machine according to claim 1, wherein said adhesive space has a resin pooling groove that is recessed into an inner wall surface of said receiving groove that faces an external surface of said leading end portions of said wing portions of said magnet cover.

8. A dynamoelectric machine according to claim 7, wherein said resin injection aperture is formed on said magnet holder so as to have an opening on a first axial end surface of said magnet holder, and so as to have an aperture direction oriented in said axial direction, and is connected to said adhesive space over a predetermined range in said axial direction.

9. A dynamoelectric machine according to claim 8, wherein a second end of said resin injection aperture in said axial direction is closed.

10. A dynamoelectric machine according to claim 7, wherein said adhesive space has a resin pooling groove that is recessed into an inner wall surface of said receiving groove that faces an external surface of said permanent magnet.

11. A dynamoelectric machine according to claim 10, wherein said resin injection aperture is formed on said magnet holder so as to have an opening on a first axial end surface of said magnet holder, and so as to have an aperture direction oriented in said axial direction, and is connected to said adhesive space over a predetermined range in said axial direction.

12. A dynamoelectric machine according to claim 11, wherein a second end of said resin injection aperture in said axial direction is closed.

* * * * *